United States Patent
Li

(10) Patent No.: US 10,780,965 B2
(45) Date of Patent: Sep. 22, 2020

(54) QUARTER-TWIST PEDAL PROPELLER

(71) Applicant: Cixi Luosaifei Kayak Co., Ltd, Ningbo (CN)

(72) Inventor: Zhengyun Li, Ningbo (CN)

(73) Assignee: Cixi Luosaifei Kayak Co., Ltd, Ningbo (CN)

( * ) Notice: Subject to any disclaimer, the term of this patent is extended or adjusted under 35 U.S.C. 154(b) by 326 days.

(21) Appl. No.: 15/817,307

(22) Filed: Nov. 20, 2017

(65) Prior Publication Data
US 2019/0016429 A1 Jan. 17, 2019

(30) Foreign Application Priority Data

Jul. 11, 2017 (CN) ...................... 2017 2 0830487 U

(51) Int. Cl.
| | | |
|---|---|---|
| B63H 16/20 | (2006.01) | |
| B63H 1/14 | (2006.01) | |
| F16H 7/02 | (2006.01) | |
| F16H 57/035 | (2012.01) | |

(52) U.S. Cl.
CPC .............. *B63H 16/20* (2013.01); *B63H 1/14* (2013.01); *F16H 7/02* (2013.01); *F16H 57/035* (2013.01); *B63H 2016/202* (2013.01)

(58) Field of Classification Search
CPC .................................. B63H 16/20; B63H 1/14
USPC .......................................................... 474/62
See application file for complete search history.

(56) References Cited

U.S. PATENT DOCUMENTS

| | | | | |
|---|---|---|---|---|
| 63,266 | A * | 3/1867 | Lewis et al. .............. | F16H 7/02 474/62 |
| 1,411,540 | A * | 4/1922 | Szafka .................... | A63B 35/10 440/29 |
| 3,182,628 | A * | 5/1965 | Avellino ................. | B63B 35/73 440/29 |
| 5,362,264 | A * | 11/1994 | Parant ................... | B63B 35/795 440/29 |
| 5,374,206 | A * | 12/1994 | Gregory ................. | B63H 16/14 440/27 |
| 6,231,408 | B1 * | 5/2001 | Lekhtman ............... | B63B 29/04 440/26 |

(Continued)

FOREIGN PATENT DOCUMENTS

CN 204895826 U 12/2015

*Primary Examiner* — Michael R Mansen
*Assistant Examiner* — Mark K Buse
(74) *Attorney, Agent, or Firm* — Bayramoglu Law Offices LLC

(57) ABSTRACT

A quarter-twist pedal propeller includes a propeller blade and a support frame. A large synchronous wheel is mounted on an upper part of the support frame through a main shaft, a pedal assembly is mounted on each end of the main shaft. A small synchronous wheel is mounted on a lower part of the support frame through a secondary shaft. A waterproof plate is mounted outside the support frame. The waterproof plate is disposed above the propeller blade. A portable cover that covers the large synchronous wheel is provided on top of the support frame. A grabbing part is provided on the portable cover. A balancing pole is transversely connected to the portable cover. The present invention is practical and cost-effective, has novel and simplified structure, and can reduce power loss due to multiple transmissions. It is convenient during pedaling.

4 Claims, 3 Drawing Sheets

(56) References Cited

U.S. PATENT DOCUMENTS

| | | | |
|---|---|---|---|
| 6,712,653 B2* | 3/2004 | Free | B63H 16/14 440/27 |
| 9,533,746 B1* | 1/2017 | Garrett | B63H 1/16 |
| 10,220,924 B1* | 3/2019 | Horvath | B63H 16/20 |
| 2008/0188146 A1* | 8/2008 | Howard | B63H 16/20 440/30 |
| 2009/0042461 A1* | 2/2009 | Walton | B63B 35/71 440/6 |
| 2016/0075420 A1* | 3/2016 | Kiffmeyer | B63H 16/20 440/27 |

* cited by examiner

QUARTER-TWIST PEDAL PROPELLER

TECHNICAL FIELD

The present invention relates to a propeller, particularly, to a quarter-twist pedal propeller.

BACKGROUND

The current pedal propellers have four gears which increase speed as well as changes direction through pedals and propeller blade. The four gears are separated into two components and fixed faraway from each other, and the shaft connecting two components is long. Therefore, the entire transmission process demands much more energy, and the energy loss is high.

SUMMARY OF THE INVENTION

The purpose of the present invention is to provide a quarter-twist pedal propeller to overcome the technical deficiency in the prior art.

In order to achieve the above purpose, the present invention discloses a quarter-twist pedal propeller as below.

The quarter-twist pedal propeller includes a propeller blade and a support frame. A large synchronous wheel is mounted on an upper part of the support frame through a main shaft, a pedal assembly is mounted on each end of the main shaft. A small synchronous wheel is mounted on a lower part of the support frame through a secondary shaft. A transmission synchronous belt is connected to the large synchronous wheel and the small synchronous wheel. The propeller blade is fixed on the secondary shaft.

A waterproof plate is mounted outside the support frame. The waterproof plate is disposed above the propeller blade.

A portable cover that covers the large synchronous wheel is provided on top of the support frame. A grabbing part is provided on the portable cover. A balancing pole is transversely connected to the portable cover.

A protective housing is fixed to the lower part of the support frame. The protective housing includes a lower front cover and a lower back cover. The small synchronous wheel is disposed in the protective housing.

A main bearing and a main grease seal are externally sleeved on the main shaft. A bearing cover is provided outside the main bearing. A secondary bearing and a secondary grease seal are externally sleeved on the secondary shaft.

The main shaft is disposed vertically to the secondary shaft.

When the transmission synchronous belt is twisted towards one side by a certain angle, the transmission synchronous belt becomes a quarter-twist arrangement.

The advantage of the present invention is that it is practical and cost-effective. The present invention has novel and simplified structure and can reduce energy loss due to multiple transmissions. In addition, it is convenient during pedaling.

DETAILED DESCRIPTION OF THE INVENTION

Figure 1:
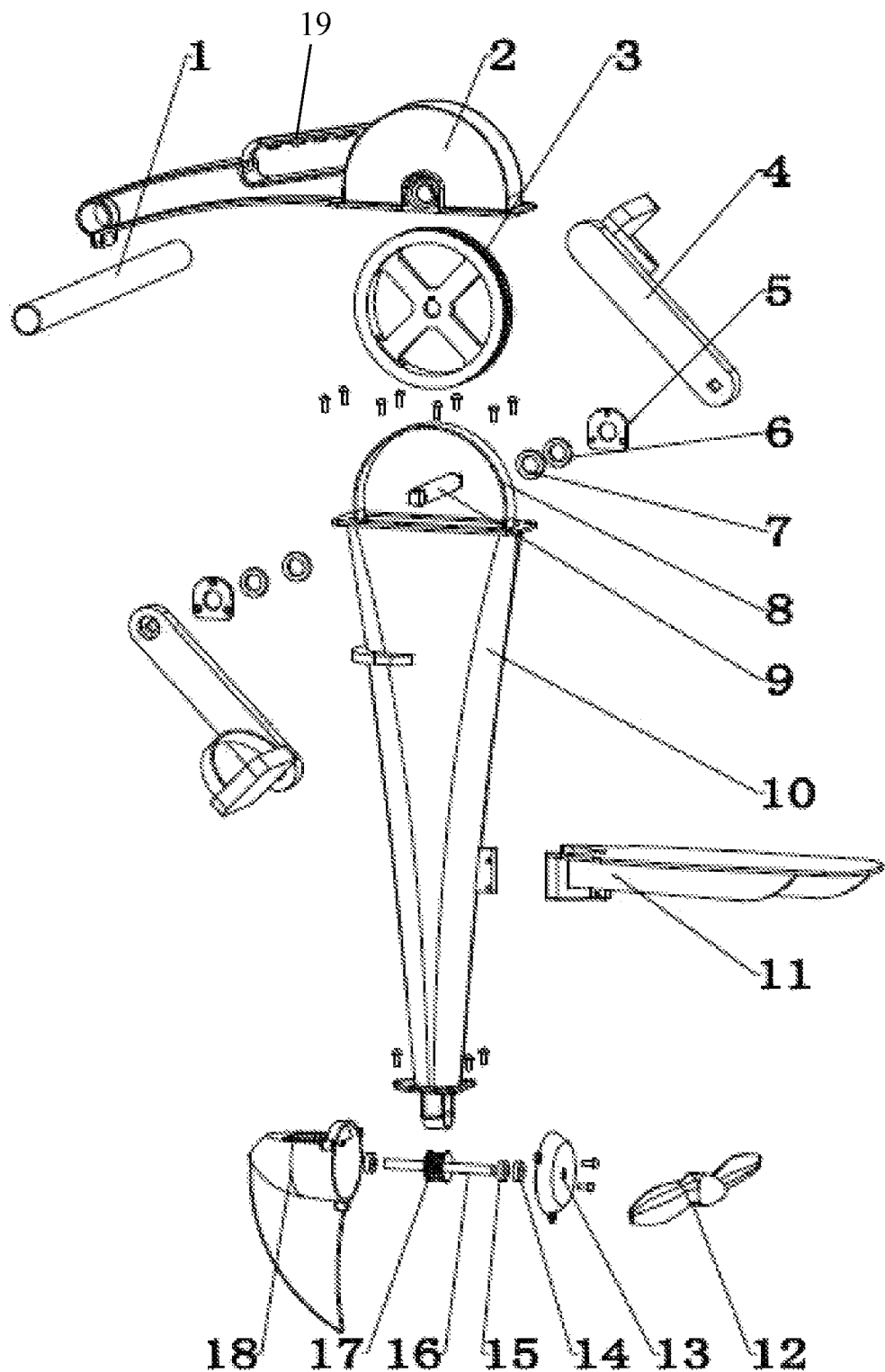
FIG. 1 is an exploded structural view of the present invention.
Figure 2:
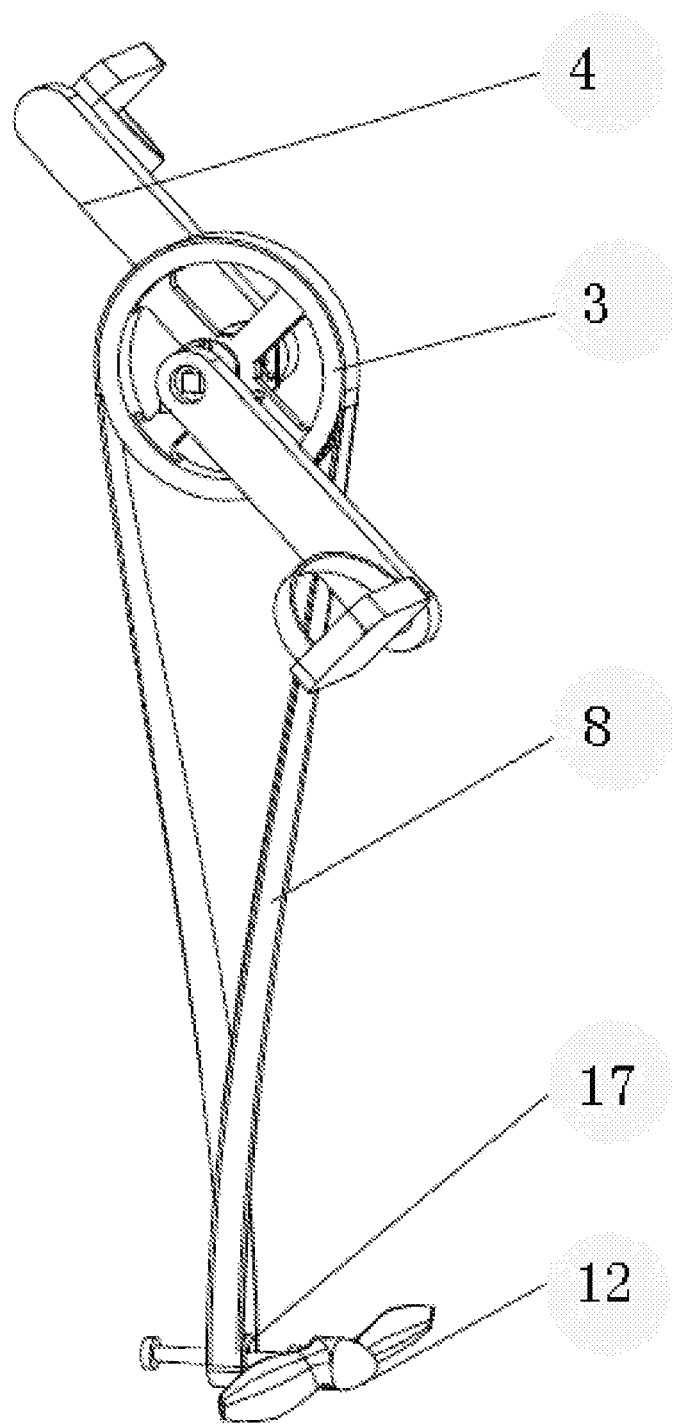
FIG. 2 is a structural view showing the assembly of the transmission synchronous belt of the present invention.
Figure 3:
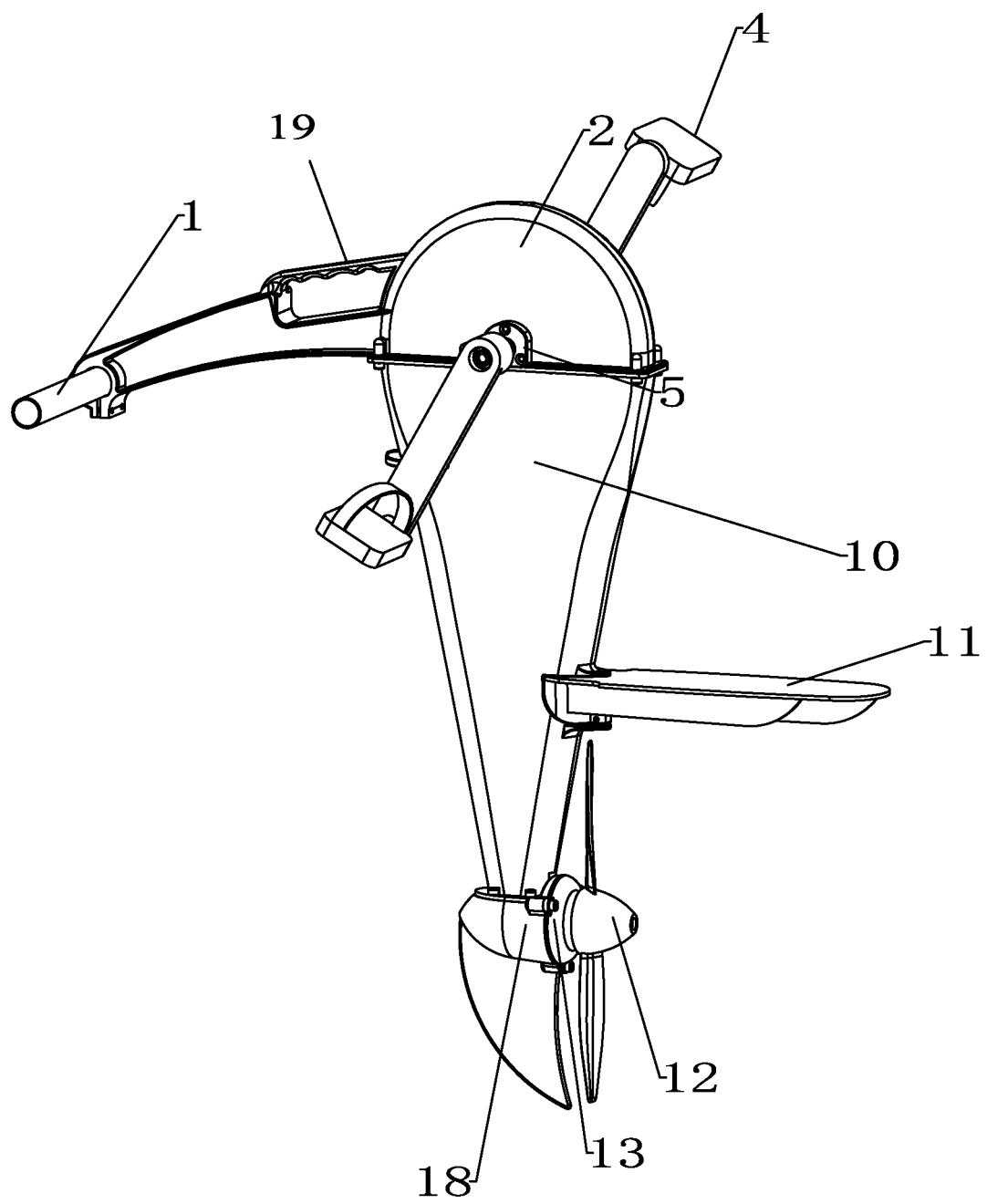
FIG. 3 is a perspective view of the assembled elements of the present invention.

As shown in FIG. 1, FIG. 2 and FIG. 3, a quarter-twist pedal propeller includes a propeller blade 12 and a support frame 10 extending from top to bottom. A large synchronous wheel 3 is mounted on an upper part of the support frame 10 through a main shaft 9. Each end of the main shaft 9 is provided with a pedal assembly 4. A small synchronous wheel 17 is mounted on a lower part of the support frame 10 through a secondary shaft 16. A transmission synchronous belt 8 is connected to the large synchronous wheel 3 and the small synchronous wheel 17. The propeller blade 12 is fixed on the secondary shaft 16.

The present invention uses quarter-twist transmission, particularly, synchronous wheel (in-between the large synchronous wheel 3 and the small synchronous wheel 17) quarter-twist transmission and reduces the energy loss due to two pairs of cone gears required by the current product for transmission and changing direction. The pedal assembly 4 drives the main shaft 9 to rotate. The rotation of the main shaft 9 makes the large synchronous wheel 3 rotate. With the transmission synchronous belt 8, the rotation of the large synchronous wheel 3 makes the small synchronous wheel 17 rotate. The rotation of the small synchronous wheel 17 makes the propeller blade 12 rotate. Finally, the propulsion is achieved. During this entire process, both the power transmission and the 90° direction changing of the secondary shaft 16 are achieved. The present invention has much simpler internal structure, and makes the power transmission much more efficient.

On the top of the propeller blade 12, there is a waterproof plate 11 covering the support frame 10.

As shown in FIG. 1 and FIG. 3, on the top of the support frame 10, there is a portable cover 2 which covers the big synchronous wheel 3. A grabbing part 19 is provided on the portable cover 2. On the top of the portable cover 2, there is a balancing pole 1 connected through a transverse sleeve.

On the lower part of the support frame 10, there is a lower front cover 13 and a lower back cover 18. Both, the lower front cover 13 and the lower back cover 18, form a protective housing that cover the small synchronous wheel 17.

A main bearing 7 and a main grease seal 5 are externally sleeved on the main shaft 9. A bearing cover is provided outside the main bearing 7. A secondary bearing 15 and a secondary grease seal 14 are externally sleeved on the secondary shaft 16.

The main shaft is disposed vertically to the secondary shaft.

Once the transmission synchronous belt 8 is twisted towards one side by a certain angle, it becomes a quarter-twist arrangement.

With a pair of synchronous wheels (the big synchronous wheel 3 and the small synchronous wheel 17), the present invention improves the transmission process, reduces the loss, and makes it possible to switch the direction while pedaling.

I claim:

1. A quarter-twist pedal propeller, comprising:
a propeller blade, and
a support frame extending from top to bottom of the quarter-twist pedal propeller,
wherein a large synchronous wheel is mounted on an upper part of the support frame through a main shaft, a pedal assembly is mounted on each end of the main shaft, a small synchronous wheel is mounted on a lower part of the support frame through a secondary shaft, a transmission synchronous belt is connected to the large synchronous wheel and the small synchronous wheel, the propeller blade is fixed on the secondary shaft;

wherein the support frame has a continuously tapered shape such that the upper part of the support frame has a first length which is longer than a second length of the lower part of the support frame; wherein the first length and the second length are measured in a horizontal distance which is in a direction perpendicular to the main shaft;

wherein a portable cover covers the large synchronous wheel and is provided on top of the support frame, a grabbing part is provided on the portable cover, a balancing pole is transversely connected to the portable cover;

wherein, a main bearing and a main grease seal are externally sleeved on the main shaft, a bearing cover is provided outside the main bearing, a secondary bearing and a secondary grease seal are externally sleeved on the secondary shaft; and wherein the transmission synchronous belt is completely enclosed by the support frame, the portable cover and a protective housing and is twisted by a certain angle such that the transmission synchronous belt becomes a quarter-twist arrangement.

2. The quarter-twist pedal propeller according to claim 1, wherein a plate is mounted outside the support frame, the plate is disposed above the propeller blade.

3. The quarter-twist pedal propeller according to claim 1, wherein the protective housing is fixed to the lower part of the support frame, the protective housing includes a lower front cover and a lower back cover, the small synchronous wheel is disposed in the protective housing.

4. The quarter-twist pedal propeller according to claim 1, wherein the main shaft is disposed perpendicular to the secondary shaft.

\* \* \* \* \*